(12) United States Patent  
Rosenbalm et al.

(10) Patent No.: US 7,165,381 B2  
(45) Date of Patent: Jan. 23, 2007

(54) CROP CONVERGING ARRANGEMENT ON MOWING IMPLEMENT EQUIPPED WITH A ROTARY CUTTER BAR

(75) Inventors: Allan Wesley Rosenbalm, Ottumwa, IA (US); Jason Chad Eubanks, Ottumwa, IA (US); Roger William Frimml, Ottumwa, IA (US); Daniel James Meyer, Ottumwa, IA (US); Matt Jay Scott, Ottumwa, IA (US)

(73) Assignee: Deere & Company, Moline, IL (US)

( * ) Notice: Subject to any disclaimer, the term of this patent is extended or adjusted under 35 U.S.C. 154(b) by 129 days.

(21) Appl. No.: 10/736,466

(22) Filed: Dec. 15, 2003

(65) Prior Publication Data

US 2005/0126142 A1  Jun. 16, 2005

(51) Int. Cl.  
*A01D 75/30* (2006.01)

(52) U.S. Cl. .............................. 56/6; 56/51; 56/16.4 R

(58) Field of Classification Search ........................ 56/6, 56/51, 16.4 R, 16.5, 16.6, 16.4 A, 16.4 B, 56/13.8, 13.9, 157  
See application file for complete search history.

(56) References Cited

U.S. PATENT DOCUMENTS 3,152,431 A * 10/1964 Beaman, Jr. et al. ........ 56/13.6
3,673,779 A * 7/1972 Scarnato et al. ............... 56/503
5,430,997 A * 7/1995 O'Halloran et al. .............. 56/6
5,722,225 A * 3/1998 Wuebbels et al. .............. 56/60
5,842,330 A * 12/1998 Richardson et al. .............. 56/6
6,158,201 A * 12/2000 Pruitt et al. ....................... 56/6
6,318,055 B1 * 11/2001 Bird ................................. 56/6
6,497,087 B1 * 12/2002 Stiefvater et al. ............ 56/16.6
6,581,362 B1 6/2003 Rosenbalm et al. .............. 56/6

* cited by examiner

*Primary Examiner*—Thomas B. Will  
*Assistant Examiner*—Alicia Torres

(57) ABSTRACT

A mowing implement is equipped with a rotary cutter bar and utilizes right- and left-hand sets of converging drums to aid those cutting discs located outboard of opposite sides of a discharge zone to converge crop to the discharge zone. The inner two of each of the sets of converging drums are identical and have inverted bowl shaped lower end plates having conical surfaces which aid in lifting crop. The insides of the bowl-shaped converging drum end plates form voids, which together with flat horizontal ejector plates, mounted on respective cutter discs for sweeping beneath the inner two of each set of converging drums, keep crop from packing beneath these converging drums. Associated with each of the innermost ones of the inner pair of converging drums is a guide element defining a horizontal shelf located for guiding crop, elevated by the conical surfaces of the lower ends of the inner most converging drums, to the discharge passage. Crop that passes beneath the shelves is guided to locations of the discharge passage inward of respective side walls bordering the discharge passage by respective legs depending from the back sides of the shelves.

20 Claims, 2 Drawing Sheets

CROP CONVERGING ARRANGEMENT ON MOWING IMPLEMENT EQUIPPED WITH A ROTARY CUTTER BAR

FIELD OF THE INVENTION

The present invention relates to crop converging arrangements for mowing implements equipped with rotary cutter bars, and more particularly relates to crop converging arrangements for mower-conditioner implements.

BACKGROUND OF THE INVENTION

The width of crop mowing machines, such as mower-conditioners, self-propelled windrowers, and the like have been increasing in order to form sufficiently large windrows of crop to meet the capacity of modern balers and forage harvesters. These wider mowing machines have presented the challenge to designers of how to converge the mowed crop. One of the solutions applied to platforms having rotary cutter bars, for example, is to provide powered crop converging drums. U.S. Pat. No. 6,581,362, granted to Rosenbalm et al. on 24 Jun., 2003 discloses such a platform.

The prior art platform has the disadvantage that crop can get forced under those converging drums, which are offset to the rear from the cutter bar centerline, when crop is converging to the crop discharge zone where the conditioner is located. When crop gets trapped under one or the other, or both of, the rearwardly offset converging drums, further crop can be carried around to the rear of the drum(s) and get trapped between the drum(s) and the bulkhead of the platform. This trapped crop can cause plugging of the drum(s), i.e., the crop can wedge so tight that the drum(s) is (are) prevented from rotating. This can result in the failure of components of the powered drum drive system.

Another drawback of the prior art platform is that crop, carried by the first cutter disc directly in front of the crop discharge zone defined between opposite inner side walls to which the conditioner is mounted, will sometimes hairpin on the fronts of these inner side walls. This crop build-up can grow in size until it interferes with crop flow or causes plugging of the converging drums.

SUMMARY OF THE INVENTION

According to the present invention, there is provided an improved crop converging arrangement for a wide mowing implement equipped with a rotary cutter bar and powered converging drums.

An object of the invention is to provide converging drums constructed so as to limit the tendency for crop to be trapped beneath them, and to more easily release that crop which does get trapped beneath them.

A further object of the invention is to mount at least one flat ejector plate for rotation with a selected mower disc so as to be located for sweeping beneath at least one of the converging drums so as to move crop from beneath it.

Another object of the invention is to provide a horizontal shelf adjacent the top of the conical surface tat the bottom of one or more of the converging drums so as to support crop that has been lifted by the conical surface as the crop flows toward the discharge zone.

Still another object of the invention is to provide a shelf, as set forth in the immediately preceding object, which is joined to a leg that extends inwardly to a location at said discharge zone and forward of a conditioning arrangement such that the leg causes crop carried by adjacent cutting discs to hairpin on it, with the conditioning arrangement then acting to strip the crop before it accumulates to cause a plug.

Yet a more specific object is to provide a converging arrangement, as defined in the immediately preceding object, wherein an upright stripper plate is provided above the horizontal shelf so as to strip crop from the adjacent converging drum and deflect the stripped crop towards the discharge zone.

These and other objects will become apparent from a reading of the ensuing description together with the appended drawings.

BRIEF DESCRIPTION OF THE INVENTION

DESCRIPTION OF THE PREFERRED EMBODIMENT

Figure 1:
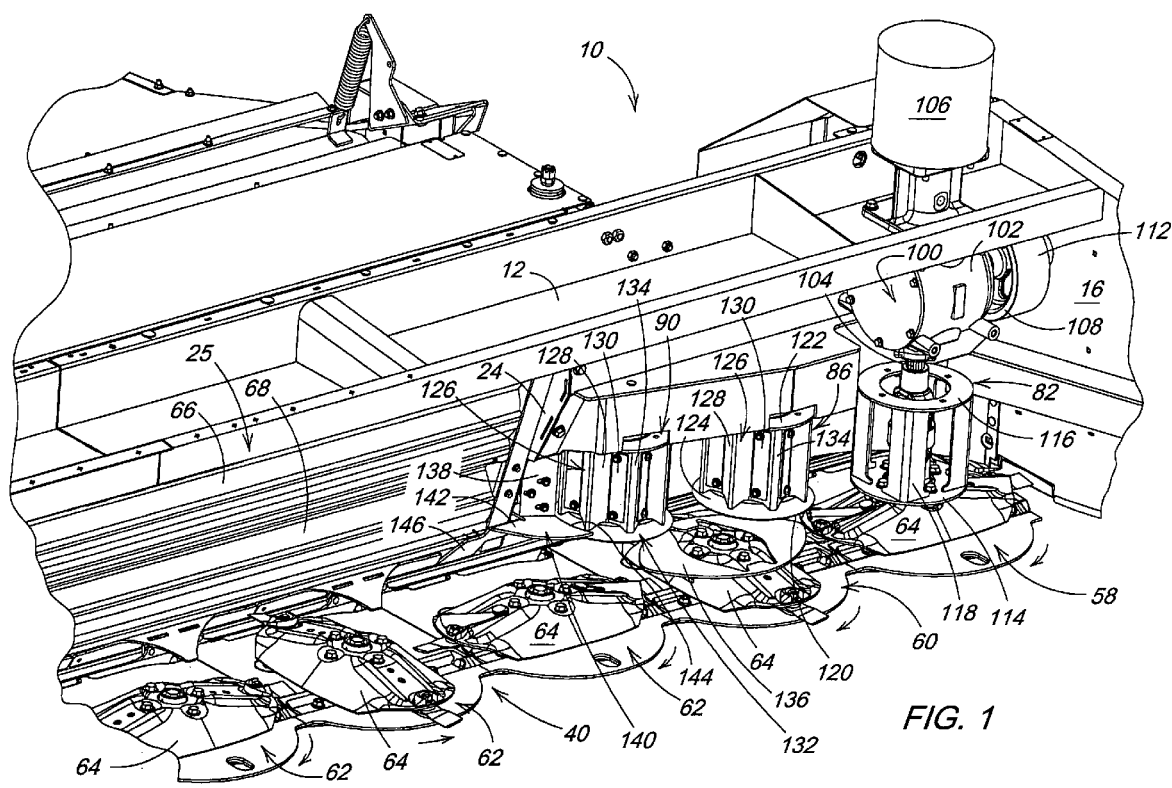
FIG. 1 is a somewhat schematic, top front perspective view including a left-hand side portion of a mower-conditioner platform equipped with a rotary disc cutter bar and a stationary crop lifting arrangement, constructed in accordance with the present invention, for directing crop into the conditioner.

Preliminarily, it is to be noted that some parts are mentioned as occurring in pairs while only the left-hand one of the pair is shown in the drawing, with it to be understood that the assembly being described is symmetrical about a vertical plane extending along a fore-and-aft centerline of the assembly.

Figure 2:
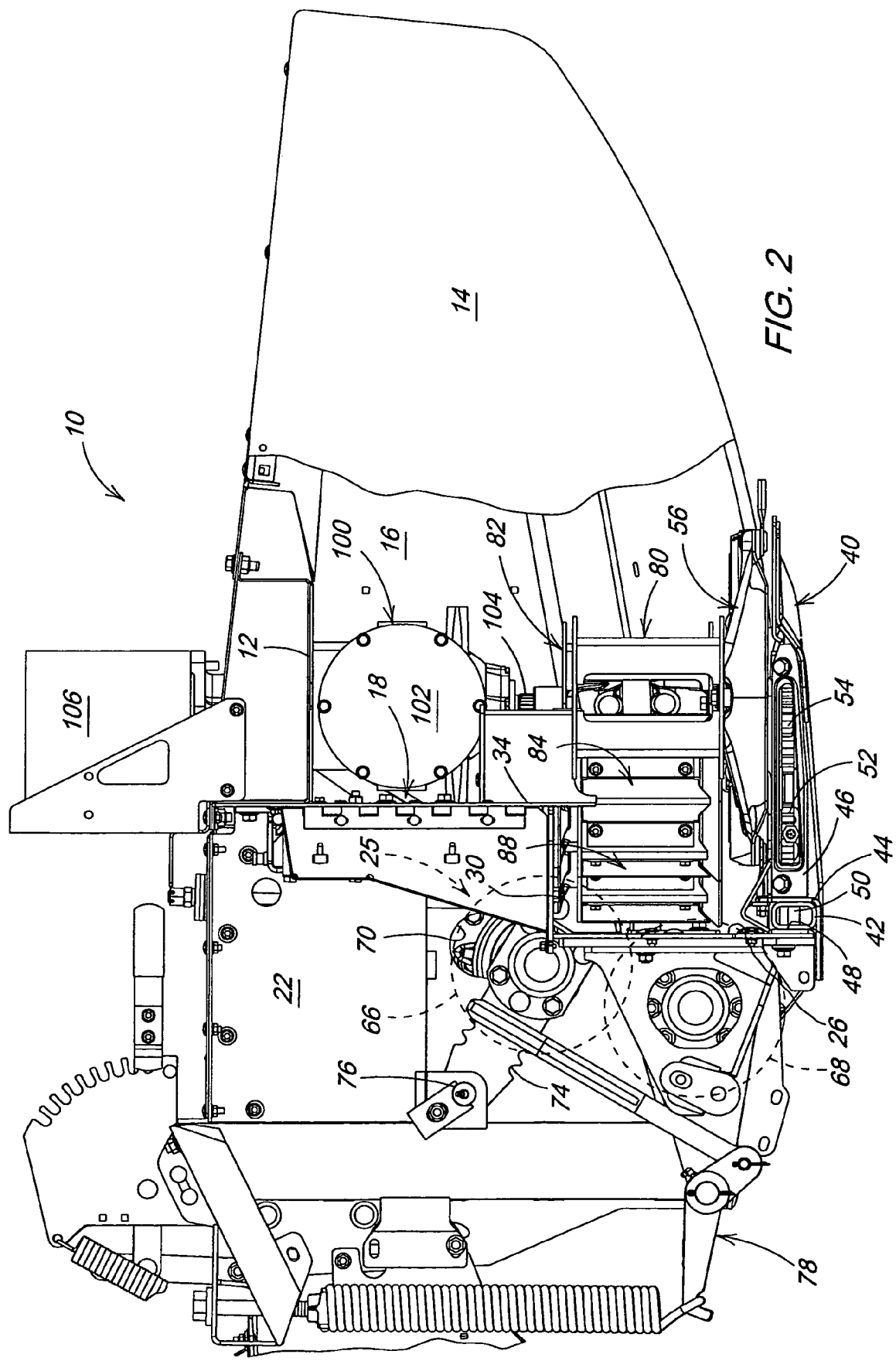
FIG. 2 is a right side view, with parts broken away for clarity, of the mower-conditioner platform of FIG. 1.

Referring now to FIGS. 1 and 2, there is shown a portion of a mowing implement 10, here embodied as a mower-conditioner implement including a trough-shaped top frame member 12 extending between right- and left-hand, outer side walls 14 and 16. Right- and left-hand upright transverse walls or bulkheads 18 and 20, of which only the right-hand bulkhead 18 is shown in its entirety, respectively, extend inwardly from the side walls 14 and 16 and terminate at the forward ends of right- and left-hand, inner side walls 22 and 24, which define the opposite sides of a crop discharge zone located centrally in the implement 10 and across which extends a crop conditioner arrangement 25. While the walls or bulkheads 18 and 20 could be a variety of upright configurations, they are here shown as including respective vertical lower sections 26 and 28, respective horizontal middle sections, with only the right-hand middle section 30 being visible, and respective vertical upper sections, with only the right-hand upper vertical section 34 being visible. Further, it is to be understood that the location of the discharge zone is not critical and that implements equipped with rotary disc cutter bars having discharge zones which are not centered relative to the cutter bar would benefit from the present invention.

An elongate rotary disc cutter bar 40 extends between the outer side walls 14 and 16 so as to be just forward of the crop conditioner arrangement 25, in a perpendicular transverse relationship to a longitudinal center plane of the implement 10 extending along a path of travel of the platform during mowing operation. Extending the length of, and behind, the cutter bar 40 is a stiffener beam 42 of rectangular cross section. Co-extensive with the stiffener beam 42 is a first mounting member 44, which is L-shaped in cross section and having a short, upright leg sandwiched between the front side of the beam 42 and a rear surface of a gear housing 46 of the cutter bar 40, and having a long leg extending beneath, and projecting rearward beyond a bottom surface of the beam 42. A second mounting member 48, which is L-shaped in cross section, has an upright first leg sandwiched between a rear surface of the beam 42 and the bulkhead lower vertical sections 26 and 28. A plurality of transversely spaced stud bolts 50 extend through aligned holes provided in the bulkhead sections 26 and 28, the upright leg of the mounting member 48, the beam 42, and the upright leg of the mounting member 44 and are screwed into respective threaded holes provided in the gear housing 46.

While the present invention could be advantageously applied to rotary cutter bars of various constructions, the cutter bar 40 is a known type containing a plurality of intermeshed spur gears including a plurality of idler gears 52 (only one is shown) meshed with each other and arranged in transverse alignment over the length of the cutter bar 40, with selected ones of the idler gears 52 being meshed with drive gears 54 (only one is shown) respectively associated, one each, with a plurality of cutting units spaced along the cutter bar 40. For details of the gear housing 46 and gearing of the cutter bar 40, reference may be had to U.S. Pat. No. 5,964,079, granted to Mellin et al. on 12 Oct. 1999, which is incorporated herein in its entirety by reference.

Respectively located outboard of the right- and left-hand inner walls 22 and 24, are right-hand outer and inner cutting units, with only the outer cutting unit 56 being shown, and left-hand outer and inner cutting units 58 and 60, respectively. A similar pair of cutting units are located outboard or to the right of the right-hand inner wall 22, with only the right-hand end cutting unit 60 being shown. Located directly in front of the discharge passage defined by the right- and left-hand inner side walls 22 and 24, respectively, and hence, directly in front of the conditioner arrangement 25, are a plurality of central cutting units 62.

The cutting units 56–62 each include a knife-carrying cutting disc 64 coupled to an upright drive shaft to which power is coupled for causing them to rotate in appropriate directions, as indicated by respective arrows, for delivering crop to the conditioner arrangement 25 extending across the discharge passage. The conditioner arrangement 25 includes upper and lower conditioner rolls 66 and 68, respectively, and each conditioner roll includes a central cylindrical drum to which is attached a plurality of axially extending ribs or flutes that mesh together for conditioning crop that passes between them. The upper conditioner roll 66 has stub shafts at its opposite ends which extend through respective openings 70, provided in the inner side walls 22 and 24, and are received in bearings carried by a pair of arms 74 respectively mounted to the side walls 22 and 24 for pivoting vertically about a pin 76. Mounted between each arm 74 and a fixed point on the implement 10 is a spring-loaded link assembly 78 that yieldably resists upward movement of the upper conditioner roll 66 caused by crop passing between the conditioner rolls 66 and 68.

Provided for augmenting the rotating cutter discs 64 in conveying cut crop into the discharge passage for further processing by the conditioner rolls 66 and 68 are right- and left-hand converging drum sets, which respectively include outer or end converging drums 80 and 82, intermediate converging drums 84 and 86, and inner converging drums 88 and 90. The end converging drums 80 and 82 are respectively mounted for rotation with the end cutting units 56 and 58. As can be seen in FIGS. 1 and 2, the intermediate converging drums 84 and 86 are set back from a line of centers passing through the centers of rotation of the cutting discs 64, and the inner converging drums 88 and 90 are set back relative to the intermediate converging drums 84 and 86.

A main power distribution gear box 100 includes a housing 102 located vertically above the left-hand end cutting unit 58. A power shaft 104 extends vertically through the housing 102 and has an upper input end coupled to a power source in the form of a reversible hydraulic motor 106. The power shaft 104 is coupled, through right-angle gearing (not shown), for driving a horizontal, leftward projecting, output shaft (not shown) which carries a drive pulley 108. A lower end of the power shaft 104 is connected, by a universal coupler 110 (FIG. 2), with an inlet shaft, not visible, of the cutting unit 58. This inlet shaft carries one of the gears 54 and is coupled for rotating the end cutter disc 64. This gear 54 is meshed for distributing power through a constant mesh gear train comprised of the idlers 52 and further gears 54 so that power is supplied for rotating the remaining cutter discs 64 of the cutter bar 40.

The belt pulley 108 is a multi-groove pulley, and trained about the pulley 108 is a drive belt 112 that is coupled to a driven pulley (not shown) carried by an input shaft of a conditioner drive gear housing, the input shaft also being connected for driving the upper conditioner roll 66. As is known, the conditioner drive gear housing contains gearing coupled to an output shaft extending from the housing and coupled for driving the lower conditioner roll 68, the direction of rotation of the pulley 108, and the arrangement of gearing in the conditioner drive housing being such that the upper and lower conditioner rolls 66 and 68 are counter-rotated so as to draw crop in between them.

It is here noted that the sets of converging drums, and other crop converging structure at the opposite sides of the implement 10 operate the same in converging crop, and for the sake of brevity only the left-hand converging drums and other converging structure is described in detail.

The left-hand outer converging drum 82 is an open structure defined by lower and upper flat end plates 114 and 116, respectively, interconnected by four vertical angle members 118 located such that their respective corners are at the peripheries of the plates 114 and 116. The lower end plate 114 is fixed for rotation with the cutter disc 64 of the left-hand end cutting unit 58.

The intermediate and inner converging drums 86 and 90 are identical, closed structures, and each is defined by bottom and top end plates 120 and 122, respectively, joined by a ribbed impeller structure. Specifically, the bottom end plate 120 is in the form of an inverted bowl, having a conical peripheral surface 124, and the top end plate 122 is in the form of a ring, spaced vertically above the bottom end plate 120 and secured thereto by four impeller plates 126 arranged in diametrically opposite pairs about the peripheral portions of the bottom and top end plates 120 and 122, respectively. The inverted bowl shape of the bottom end plate 120 has a significance which is described below. The impeller plates 126 each include a central right angular rib section 128 which opens inwardly and is joined, at respective ends of its opposite sides, with respective mounting sections 130 that each define an included angle of 135° with the associated rib side. The lower end of each of rib sections 128 is shaped complimentary to, and welded to, the conical peripheral surface 124 of the bottom end plate 120. The lateral ends of adjacent mounting sections 130 of adjacent impeller plates 126 are spaced from each other so as to define a gap and are disposed along respective lines which are perpendicular to each other. A filler plate 132, in the form of an angle member, is bolted to each of the adjacent mounting sections 130 of the impeller plates 126 so as to close the gap between the adjacent mounting sections 130 and to cooperate with the adjacent mounting sections 130 so as to define a further conveying rib section 134 for engaging crop.

The inclination of the conical peripheral surface 124 of the respective bottom end plates 120 of the converging drums 86 and 90 causes crop to be deflected upward for engagement by the conveying rib sections 128 and 134. Some crop will pass beneath the bottom end plates 120, but is prevented from becoming packed under them partly due to their inverted bowl shape, since this shape defines a central relief area, and partly due to the action of an oval-shaped, flat ejector plate 136 that is mounted for rotation with the cutting disc 64 of the cutting unit 60.

The ejector plate 136 has its major axis disposed perpendicular to a major axis of the oval cutter disc 64 and is mounted such that it sweeps a path beneath the bottom plate 120 of each of the converging drums 86 and 90. It is to be noted that a similar ejector plate 136 could be mounted for rotation with the end cutting disc 64, and in that location would sweep beneath the converging drum 86 and would also act to prevent crop from wrapping about the end converging drum 82.

To prevent crop from being carried around behind the inner converging drum 90, an upright stripper plate 138 is mounted to a front location of the left-hand inner side wall 24, and as viewed from the top, is angled forward and outward from the side wall 24 so as to dispose a vertical outer edge adjacent the cylindrical path traced by the rib sections 128 and 134 of the inner converging drum 90.

A further guide element 140 is provided for aiding in the transfer of crop from the inner converging drum 90 to the roll conditioner arrangement 25. The guide element 140 includes an upright mounting section (not visible) located behind and mounted together with the stripper plate 138 to the forward end of the left-hand inner wall 24. The guide element 140 further includes a horizontal guide shelf 142 located approximately at the height of, and having an inner edge 144 disposed on a radius about the periphery of, the converging drum 124. The guide shelf 142 extends from its edge 144 to a location a short distance to the right of the left-hand inner side wall 24. Joined along a back edge of the horizontal shelf 142 is a deflector leg 146 which is inclined downwardly to the rear and extends in front of the conditioner arrangement to a location approximately in fore-and-aft alignment with the axis of rotation of the cutting disc 64 of the left-most central cutting unit 62. Although not clearly evident in the drawing, an inner edge of the leg 142 is beveled so as to slope outward from front to rear. This shape enhances the ability of the leg to hairpin crop that has been carried around by the cutting disc 64. The hairpinned crop is then stripped off by the conditioner arrangement.

It is to be noted that, if desired, stripper plates, like the plate 138, can be positioned for stripping other converging drums, and that a crop transporting shelf, like the shelf 142, could be mounted adjacent the conical bottom 124 of the converging drum 86 for supporting and directing crop toward the discharge zone. In this case, the leg 146 would not be joined to the shelf 142.

Thus, in operation, the left-hand set of converging drums 82, 86 and 90 operate in conjunction with the two cutting discs 64 outward to the left from the left-hand inner side wall 24 to converge crop to the central discharge zone where the conditioner assembly 25 is located.

Crop that comes into engagement with the conical surface 124 of the bottom end plates 120 of the intermediate and inner converging drums 86 and 90 will be elevated, with the elevated crop being prevented from going behind the inner converging drum 90 by the stripper plate 138, and being guided and supported by the horizontal shelf 142 of the guide element 140 so as to pass into the discharge passage without hesitation. Any additional stripper plates or shelves used in conjunction with the intermediate converging drum 86 would operate in a similar fashion.

At the same time, the oval shaped ejector plate 136 would sweep beneath the converging drums 86 and 90, and, if so equipped, the ejector plate 136 carried by the end cutting disc 64 would sweep beneath the converging drum 86, so as to prevent crop from accumulating beneath the converging drums, and with crop at this lower level is being guided rightward of the left-hand inner side wall 24 by the deflector leg 146 of the guide element 140. In this location, any accumulation of crop caused by its tendency to hairpin on the inner edge of the leg 146 will be minimized, since the lower conditioner roll 68 will act to strip away the crop before the amount of accumulated crop is great enough to hinder crop flow.

Having described the preferred embodiment, it will become apparent that. various modifications can be made without departing from the scope of the invention as defined in the accompanying claims.

The invention claimed is:

1. In combination with a mowing implement including a rotary disc cutter bar extending transversely to a direction of travel during mowing operation and including transversely spaced, knife-carrying rotary discs, structure aiding in converging cut crop toward a discharge zone located behind the cutter, comprising: at least one converging drum having an upright axis of rotation located behind a line of centers of said cutter bar and being located upstream relative to crop movement toward said discharge zone and adjacent at least one of said rotary discs; and said at least one converging drum having a lower end including an outer peripheral edge located a first distance vertically above a path followed by knife blades carried by said at least one of said rotary discs and including an inner region surrounding said upright axis and located a second distance, which is greater than said first distance, above said path, thereby creating a relief area beneath said at least one converging drum; and said relief area being devoid of any further structure so as to allow crop to move into said relief area.

2. The combination, as defined in claim 1, wherein said lower end of said at least one converging drum includes a top surface which is inclined upwardly and inwardly toward said upright axis of rotation of the converging drum, whereby crop engaging said lower end is lifted.

3. The combination, as defined in claim 1, wherein said structure aiding in converging cut crop includes a flat ejector plate mounted to a top of, and for rotation with, said at least one rotary disc; and said flat ejector plate being dimensioned and located relative to said lower end of said at least one converging drum so as to sweep a path beneath said at least one converging drum.

4. The combination, as defined in claim 1, wherein said at least one of said rotary discs is an end rotary disc.

5. The combination, as defined in claim 4, wherein said structure aiding in converging cut crop further includes a second converging drum mounted to a top of, and for rotation with, said end rotary disc.

6. The combination, as defined in claim 3, wherein said at least one converging drum is located adjacent to a second rotary disc; and a second flat ejector plate being mounted to a top of, and for rotation with said second rotary disc; and said second flat ejector plate being dimensioned and located relative to said lower end of said at least one converging drum for sweeping a path beneath said at least one converging drum.

7. The combination, as defined in claim 1, wherein said lower end of said at least one converging drum is in the shape of an inverted bowl.

8. The combination, as defined in claim 2, wherein said surface of said at least one converging drum is conical.

9. The combination, as defined in claim 1, wherein said structure aiding in the delivery of crop includes at least a second converging drum, identical to said at least one converging drum, mounted for rotation about a second upright axis located behind and downstream from said upright axis of rotation of said at least one converging drum.

10. The combination, as defined in claim 1, wherein said structure aiding in the delivery of crop includes a guide element defining a horizontal shelf located adjacent said at least one converging drum for receiving crop delivered by said at least one converging drum; and said shelf extending downstream from said at least one converging drum.

11. The combination, as defined in claim 10, wherein said mowing implement includes a conditioner arrangement located just rearward of said discharge zone; and said guide element further including a leg joined to, and extending down and inwardly from, a back of, said shelf to a location in front of said conditioner arrangement.

12. The combination, as defined in claim 11, wherein said leg of said guide element has an inner edge which slopes outwardly to the rear so as to induce crop material to hairpin on said edge in a location where it is stripped off by said conditioner arrangement.

13. The combination, as defined in claim 10, wherein said guide element further includes a stripper plate located directly above said shelf and having an edge located adjacent a path swept by said at least one converging drum.

14. In combination with a mowing implement including a rotary disc cutter bar extending transversely to a direction of travel during mowing operation and including transversely spaced, knife-carrying rotary discs, structure aiding in converging cut crop toward a discharge zone located behind the cutter, comprising: at least one converging drum mounted having an upright axis of rotation located behind a line of centers of said cutter bar and being located upstream relative to crop movement toward said discharge zone and adjacent at least one of said rotary discs so that knives carried by said at least one of said rotary discs sweeps a path beneath said at least one converging drum; and said at least one converging drum having a lower end including an upper surface inclined upwardly toward said upright axis and including a lower surface having, relative to said axis of rotation, a central region located above said path by a distance greater than a peripheral region, thereby creating a relief area beneath said at least one converging drum; and said relief area being devoid of any further structure so as to permit crop to move into said relief area.

15. The combination, as defined in claim 14, wherein said structure aiding in converging cut crop includes a flat ejector plate mounted to a top of, and for rotation with, said at least one rotary disc; and said flat ejector plate being dimensioned and located relative to said at least one converging drum so as to sweep a path beneath said at least one converging drum.

16. The combination, as defined in claim 15, wherein said at least one converging drum is located adjacent to a second rotary disc; and a second flat ejector plate being mounted to a top of, and for rotation with said second rotary disc; and said second flat ejector plate being dimensioned and located relative to said at least one converging drum for sweeping a path beneath said at least one converging drum.

17. The combination, as defined in claim 14, wherein said structure aiding in the delivery of crop includes a guide element defining a horizontal shelf located adjacent said upper surface of said lower end of, and extending downstream from, said at least one converging drum for guiding crop elevated by said upper surface of said at least one converging drum.

18. The combination, as defined in claim 17, wherein said guide element further includes a stripper plate located directly above said shelf and having an edge located adjacent a path swept by said at least one converging drum.

19. The combination, as defined in claim 17, wherein said mowing implement includes a conditioner arrangement located just rearward of said discharge zone; and said guide element further including a leg joined to, and extending down and inwardly from, a back of, said shelf to a location in front of said conditioner arrangement.

20. The combination, as defined in claim 19, wherein said leg of said guide element has an inner edge which slopes outwardly to the rear so as to induce crop material to hairpin on said edge in a location where it is stripped off by said conditioner arrangement.

* * * * *